United States Patent
Novotny et al.

(12) 
(10) Patent No.: US 8,149,915 B1
(45) Date of Patent: Apr. 3, 2012

(54) REFINEMENT OF MOTION VECTORS IN HIERARCHICAL MOTION ESTIMATION

(75) Inventors: Pavel Novotny, Waterloo (CA); Michael D. Gallant, Kitchener (CA); Lowell L. Winger, Waterloo (CA)

(73) Assignee: LSI Corporation, Milpitas, CA (US)

( * ) Notice: Subject to any disclaimer, the term of this patent is extended or adjusted under 35 U.S.C. 154(b) by 1160 days.

(21) Appl. No.: 11/947,044

(22) Filed: Nov. 29, 2007

(51) Int. Cl.
*H04N 7/12* (2006.01)

(52) U.S. Cl. .................................. 375/240.16

(58) Field of Classification Search .................. 375/240, 375/240.01, 240.12, 240.16
See application file for complete search history.

(56) References Cited

U.S. PATENT DOCUMENTS

2006/0222074 A1 * 10/2006 Zhang ...................... 375/240.16
* cited by examiner

*Primary Examiner* — Allen Wong
(74) *Attorney, Agent, or Firm* — Christopher P. Maiorana, PC

(57) ABSTRACT

A method of motion estimation (ME) refinement. The method generally includes the steps of (A) generating an initial motion vector (MV) by conducting a first ME on an initial block in a picture, the initial block covering an initial area of the picture, (B) generating a current MV by conducting a second ME on a current block in the picture, (i) the current block covering a subset of the initial area and (ii) the second ME being seeded by the initial MV, (C) generating at least one additional MV by conducting at least one third ME on the current block, the at least one third ME being seeded respectively by at least one neighboring MV spatially adjacent to the current MV and (D) generating a refined MV of the current block by storing in a memory a best among the current MV and the additional MV.

20 Claims, 7 Drawing Sheets

REFINEMENT OF MOTION VECTORS IN HIERARCHICAL MOTION ESTIMATION

FIELD OF THE INVENTION

The present invention relates to digital video motion estimation generally and, more particularly, to a method and/or apparatus for implementing refinement of motion vectors in a hierarchical motion estimation.

BACKGROUND OF THE INVENTION

In hierarchical motion estimation (ME), video frames undergo a process of resolution reduction. Several layers are constructed, each containing the same frame as the previous layer, but having both dimensions reduced by a certain scaling factor. The scaling factor is usually a factor of 2, a small power of 2, or the power of another integer. The result is a pyramid, where the lowest layer has the original frame and each layer above has the same frame at increasingly reduced resolutions.

After pyramids have been created for both a target frame being motion estimated and a reference frame, a full search takes place in the highest layer for target regions. Hence, a search window is defined in the reduced reference frame and all candidate motion vectors are evaluated over the search window for each reduced block in the target frame. The motion vectors are found by comparing all of the blocks in the search window to the reduced blocks in the target frame using a comparison metric (i.e., a sum of absolute difference (SAD) or a sum of squared differences (SSD)).

The resulting motion vectors are then propagated to the next layer down by multiplying each of the motion vector coordinates with the scaling factor. The scaled vectors become the center of new searches in the next layer. Because of the resolution increase at the next layer, each of the scaled motion vectors actually becomes the search center of several target regions in the next layer, as dictated by the scaling factor and relative region sizes between each layer. For example, at a scaling factor of 2×2 and equal region sizes, a single motion vector for a particular region in the higher layer will seed four regions in the next layer below. Once seeded, the motion vectors in the next layer are motion refined against the reference frame. The process of propagating the motion vectors and refining the motion vectors is repeated until results for the bottom layer are reached, where the process ends.

A common problem that arises in hierarchical searches is that an erroneous match in the higher layer usually propagates to the lower layers, often resulting in an erroneous motion vector. Erroneous motion vectors are not rare cases since the lower resolution of the higher layers often leads to ambiguity in the motion estimations. A number of candidate blocks will have similar metric values (i.e., SADS) and while the initial motion vector selected may be slightly better in the higher layer, the initial motion vector may not be better in the bottom layer.

Another common problem arises in hierarchical searches when a moving object boundary falls in the middle of the target region at the higher layers. In such a case, the motion estimation can lock to either side of the object, thus producing a wrong motion vector predictor for the other side. At the next layer down, the motion vector predictor will be applied to the entire target region even through part of the target region contains the moving object and another part contains a stationary background. If the next layer search range is not large enough to compensate for the situation, (and many motion vector field smoothing techniques, such as rate-distortion optimization, can prevent the motion estimation from fixing the situation even if the search range is sufficient) the same motion vector will propagate into both regions and nothing is available to fix the motion vector of the other side. As such, dragging artifacts are commonly produced in the video.

An existing solution to the hierarchical search problems is to perform a conventional search. However, conventional searches use very large search ranges to capture high motion and/or high temporal separation that are compounded at higher resolutions (i.e., high definition frames). Otherwise, the conventional searches suffer degraded compression efficiency for large frames.

Another existing solution to the hierarchical search problems is to propagate more than a single motion vector predictor from each target region down to the next layer. However, the increase in motion vector predictors results in more searches in the next layer, thereby increases computational complexity.

SUMMARY OF THE INVENTION

The present invention concerns a method of motion estimation refinement. The method generally comprises the steps of (A) generating an initial motion vector by conducting a first motion estimation on an initial block in a picture, the initial block covering an initial area of the picture, (B) generating a current motion vector by conducting a second motion estimation on a current block in the picture, (i) the current block covering a subset of the initial area and (ii) the second motion estimation being seeded by the initial motion vector, (C) generating at least one additional motion vector by conducting at least one third motion estimation on the current block, the at least one third motion estimation being seeded respectively by at least one neighboring motion vector spatially adjacent to the current motion vector and (D) generating a refined motion vector of the current block by storing in a memory a best among the current motion vector and the additional motion vector.

The objects, features and advantages of the present invention include providing a method and/or apparatus for implementing refinement of motion vectors in a hierarchical motion estimation that may (i) use previously refined current layer neighboring motion vectors to refine a current motion vector, (ii) incur a limited increase in computational complexity as compared with conventional techniques, (iii) provide a smooth vector field leading to improved compression efficiency, (iv) provide accurate tracking of the true motion of objects and/or (v) be applied to non-hierarchical sub-block motion estimation designs.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
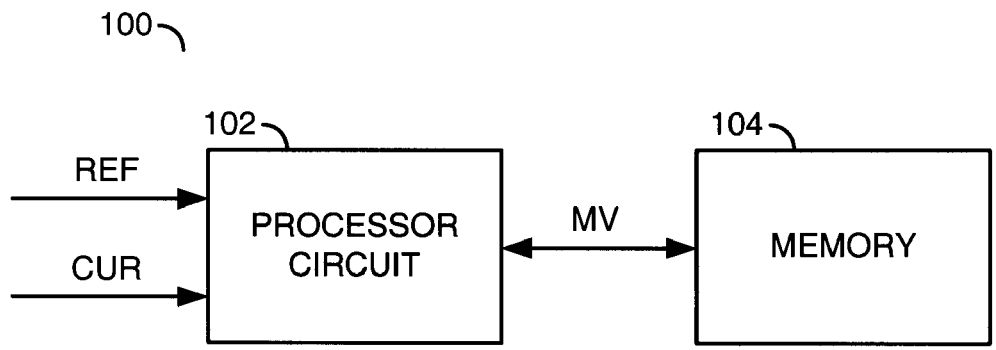
FIG. 1 is a block diagram of an apparatus in accordance with a preferred embodiment of the present invention.

Referring to FIG. 1, a block diagram of an apparatus 100 is shown in accordance with a preferred embodiment of the present invention. The apparatus (or system) 100 generally uses the resulting motion vectors of external blocks near the corners of a current block in a current layer (or level) of a hierarchical search to perform small search-range refinement searches. A current motion vector of the current block may be replaced with a refinement motion vector if the motion estimation score of the refinement motion vector is lower than the motion estimation score of the current motion vector. The refined motion vectors may then be used as inputs to the next layer below, where the process is repeated.

Motion estimation is an operation that generally identifies how an area (macroblock, block or sub-block) of a current picture (e.g., field, frame or image) has moved relative to a similar area in one or more reference pictures. The motion estimation operation may create a single motion vector per area for a predictive type of coding and two motion vectors per area for a bidirectional type of coding. The reference pictures may exist temporally before and/or temporally after the current picture.

The apparatus 100 may be implemented as part of a digital video encoder. The apparatus 100 generally comprises a circuit (or module) 102 and a circuit (or module) 104. A signal (e.g., CUR) may be received by the circuit 102. Another signal (e.g., REF) may also be received by the circuit 102. A signal (e.g., MV) may be transferred between the circuit 102 and the circuit 104.

The circuit 102 may implement a motion estimator. The circuit 102 is generally operational to calculate multiple motion vectors for a current picture against one or more reference pictures. Pixels of the current picture may be received via the signal CUR. Reference pixels of the reference pictures may be received via the signal REF. The estimated motion vectors may be exchanged with the circuit 104 in the signal MV.

The circuit 104 generally implements a memory. The circuit 104 may be operational to store the motion vectors estimated by the circuit 102. The circuit 104 generally makes the motion vectors available back to the circuit 102 and to compression techniques performed by the apparatus 100.

Figure 2:
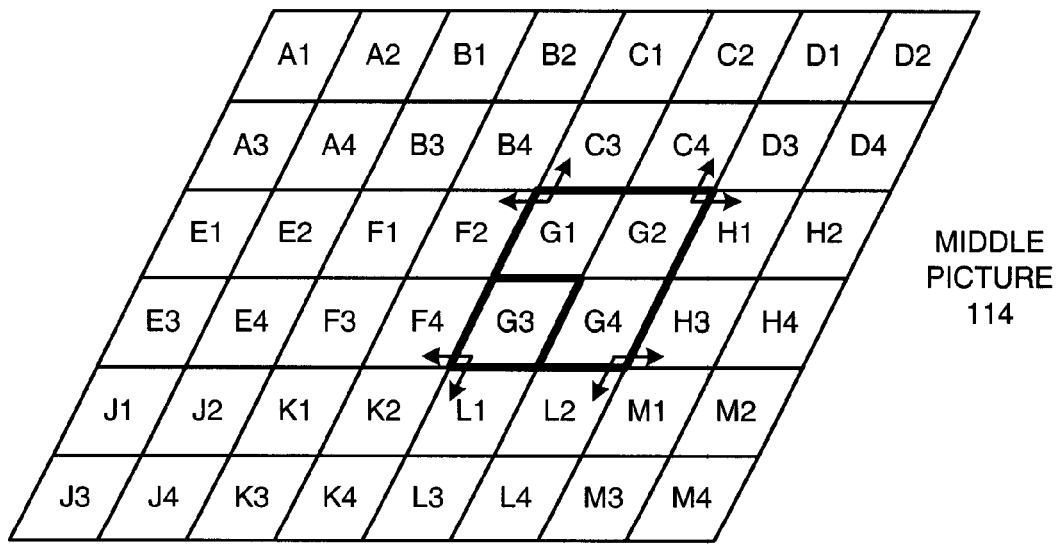
FIG. 2 is a diagram of example layers of a hierarchy of a current picture.

Referring to FIG. 2, a diagram of example layers of a hierarchy 110 of a current picture is shown. The example is based on a three-layer hierarchy. Other numbers of layers may be implemented in the hierarchy to meet the criteria of a particular application.

A bottom layer 112 (only partially shown) of the hierarchy 110 generally comprises the current (or bottom) picture undergoing motion estimation. A middle picture in the middle layer 114 may be created by downsampling the bottom picture per a scale factor in each of a horizontal dimension and a vertical dimension (e.g., a 2H×2V scale factor). A top picture may be created in the top layer 116 by downsampling the middle picture per the scale factor. Therefore, (i) the middle picture is both spatially smaller and at a lower resolution than the bottom picture and (ii) the top picture is both spatially smaller and at a lower resolution than the middle picture. The one or more reference pictures may be downsized in the same manner as the current picture.

Using a 2H×2V scale factor as an example, a 1920×1080 bottom picture may be reduced to a 960×540 middle picture and a 480×270 top picture. As such, instead of performing a full motion estimation search for each of the 32,400 8×8 blocks in the bottom picture, the apparatus 100 may start by searching the only 2,025 8×8 blocks in the top picture. Using different scale factors between the middle layer 114 and the top layer 116, and/or using more layers in the hierarchy 110 may reduce the number of initial motion estimation searches to be performed.

Figure 3:
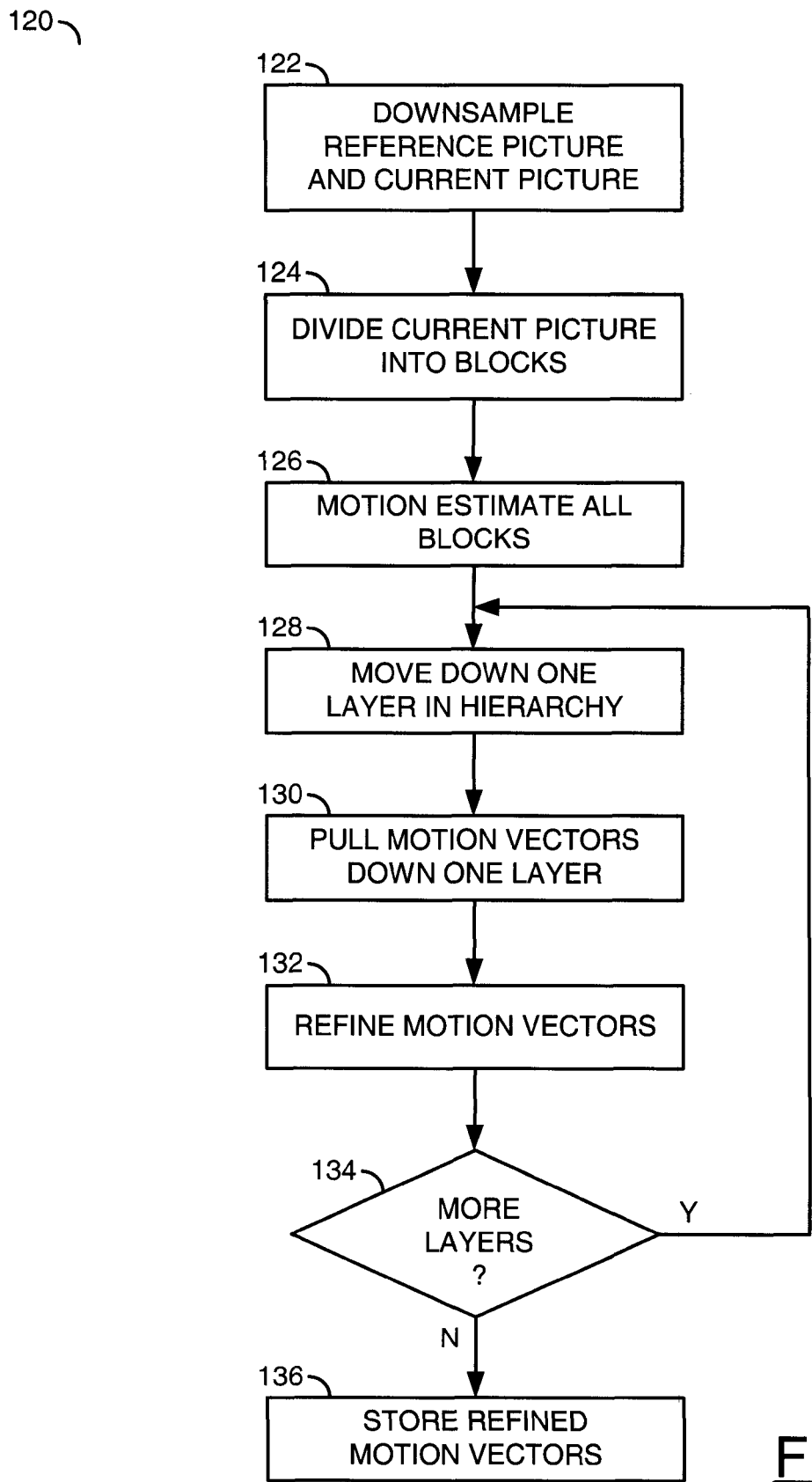
FIG. 3 is a flow diagram of an example method of a hierarchical motion estimation.

Referring to FIG. 3, a flow diagram of an example method 120 of a hierarchical motion estimation is shown. The method (or process) 120 may be implemented by the apparatus 100. The method 120 generally comprises a step (or block) 122, a step (or block) 124, a step (or block) 126, a step (or block) 128, a step (or block) 130, a step (or block) 132, a step (or block) 134 and a step (or block) 136.

The motion estimation may begin in the step 122 where the circuit 102 downsamples the current picture received in the signal CUR and the reference picture received in the signal REF to create two pyramids. In the step 124, the circuit 102 may divide the top picture into multiple blocks (e.g., 8×8 pixel blocks). In the example shown in FIG. 2, the top picture (e.g., layer 116) may be divided into 12 blocks. The circuit 102 may then conduct a motion estimation for each of the blocks in the top layer in the step 126. In FIG. 2, the motion vectors of the top picture calculated by the motion estimations are labeled A-L.

After finding some or all of the motion vectors in the top layer, the circuit 102 may move down a layer in the hierarchy (e.g., to the middle layer 114) in the step 128. The top layer motion vectors (e.g., A-L) may be copied to corresponding blocks in the middle layer 114 in the step 130 by the circuit 102. For example, the motion vector G in the top layer 116 may be copied into all of the motion vectors G1, G2, G3 and G4 in the middle layer 114. Similar copying may be performed by the circuit 102 for the remaining motion vectors A-L.

Motion estimation refinement searches may be conducted for the middle layer motion vectors A1-L4 by the circuit 102 in the step 132. Each motion estimation refinement search is generally simpler and computationally less complex that a full motion estimation search due the search center seed vectors. If more lower layers exist in the hierarchy 110 (e.g., the YES branch of step 134), the circuit 102 may repeat the steps 128-132 to copy the refined motion vectors from the middle layer 114 to the lower layer 112 and then refine the lower layer motion vectors. Once the motion vectors of the lowest layer (e.g., the current picture) have been refined (e.g., the NO branch of step 134), the circuit 102 may copy the final refined motion vectors to the circuit 104 for storage in the step 136.

The above method 120 may be repeated for each layer of the hierarchy 110 and for each picture of the video content. For example, after refining the middle layer 114 the circuit 102 may move down to the bottom layer 112 in the step 128. The refined motion vector G3 may then be copied down as a search center seed to the four corresponding blocks in the bottom picture (e.g., G3*a*=G3, G3*b*=G3, G3*c*=G3 and G3*d*=G3) per step 130. The motion vectors in the bottom picture may be refined by the circuit 102 in the step 132. Afterwards, the refined motion vectors of the bottom picture in the bottom layer 112 may be copied to the circuit 104 in the step 136 and the process ended.

Figure 4:
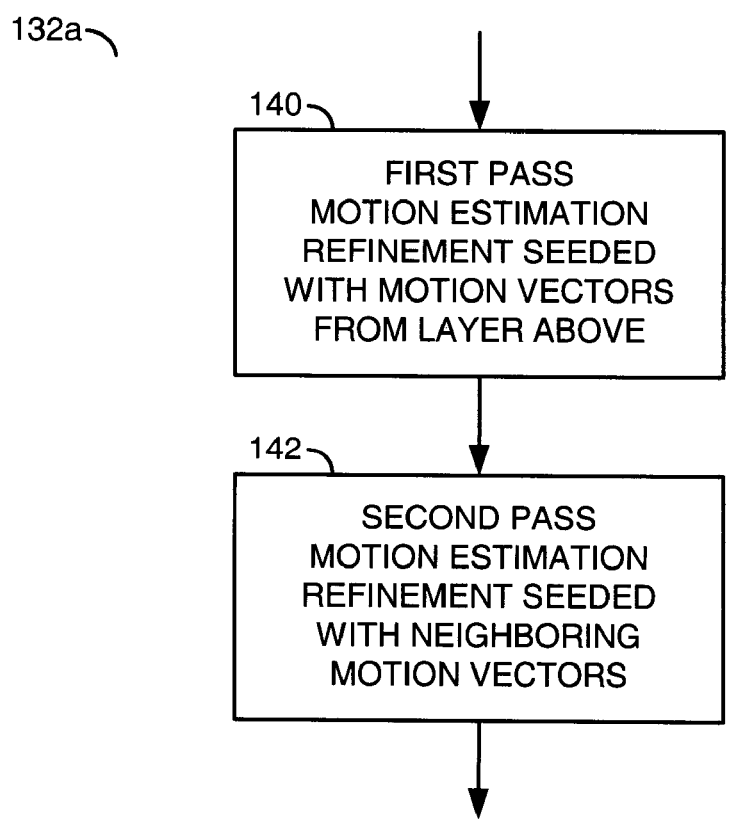
FIG. 4 is a flow diagram of a first example implementation of a motion estimation refinement method.

Referring to FIG. 4, a flow diagram of a first example implementation of a motion estimation refinement method 132a is shown. The method (or process) 132a may be implemented by the apparatus 102 and used as the step 132 of the method 120. The method 132a generally comprises a step (or block) 140 and a step (or block) 142.

By way of example, a refinement of the motion vectors at the middle layer 114 (and again at the bottom layer 112) is generally described as follows. Considering the "G" block in the top layer 116, the motion vector G may be copied to the middle layer 114 as motion vector search centers in the current group of blocks corresponding to the "G" block (e.g., G1=G, G2=G, G3=G and G4=G). A first pass refinement of the middle layer motion vectors A1-L4 may then be conducted by the circuit 102 in the step 140 to improve the accuracy of the middle layer motion vectors A1-L4 (e.g., usually G1≠G, G2≠G, G3≠G and G4≠G). The refinement motion estimations generally use the top layer motion vectors A-L as seeds of search centers for the motion estimation operations. The overall refinement may be conducted in a left-to-right pattern in each row and row-by-row from top to bottom of the picture. Other patterns may be implemented to meet the criteria of a particular application.

One or more second pass motion estimation refinements may be conducted by the circuit 102 in the step 142 for each of the middle picture blocks. The second pass refinements may begin either (i) during the first pass or (ii) after the first pass has completed. A second pass refinement of a particular block generally uses one or more the refined motion vectors from one or more outer neighbor blocks as new search center seeds. For example, the "G1" block may have a motion estimation performed using the motion vector F2 (previously refined in the first pass) as the search center seed. An optional motion estimation may also be performed using the motion vector C3 (previously refined in the first pass) as the search center seed. The single motion vector among the three motion vectors with the minimum motion estimation score may be carried forward and stored in the circuit 104 as the refined motion vector for the "G1" block.

In some embodiments, a neighboring motion vector may be used to replace the current motion vector only if the corresponding neighboring motion estimation score is less than a ratio of the current motion estimation score. The ratio is based on an observation that if an object edge is located in the current block, the neighboring motion vector may be locked properly on the object. Therefore, the neighboring motion vector may be a better candidate to track the object. Every non-top layer may perform the above motion estimation refinement to improve the quality of the motion vectors used to seed the following layer.

Figure 5:
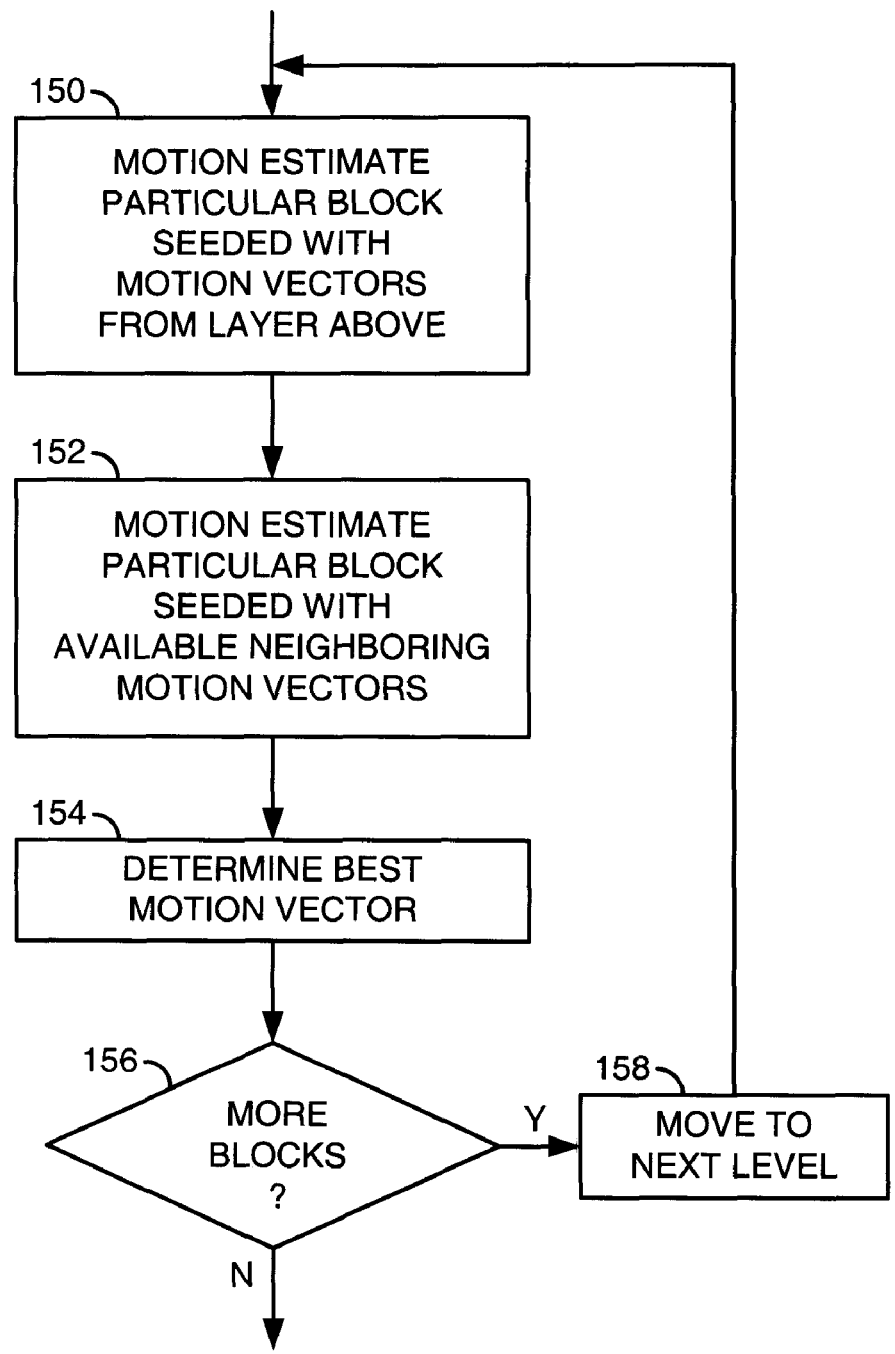
FIG. 5 is a flow diagram of a second example implementation of a motion estimation refinement method.

Referring to FIG. 5, a flow diagram of a second example implementation of a motion estimation refinement method 132b is shown. The method (or process) 132b may be implemented by the apparatus 102 and used as the step 132 of the method 120. The method 132b generally comprises a step (or block) 150, a step (or block) 152, a step (or block) 154 and a step (or block) 156.

In the step 150, the circuit 102 may conduct a motion estimation refinement of a particular block (e.g., the "G2" block) using the pulled-down motion vector (e.g., the motion vector G) from the top picture as an initial search center seed. One or more additional motion estimation refinements for the particular block may then be performed in the step 152 using one or more neighboring motion vectors (e.g., the motion vector C4 and the motion vector H1), if available, as additional search centers. The circuit 102 may identify a best motion vector generated by the motion estimation refinements as the refined motion vector for the particular block in the step 154. If more blocks are available to refine (e.g., the YES branch of step 156) the circuit 102 may move to the next block in the step 158. If no more blocks are available to refine (e.g., the NO branch of step 156), the refinement at the current level may end.

Regarding the motion vectors C4 and H1, a left-to-right, top-to-bottom scan through the middle picture may result in the motion vector C4 being previously refined (e.g., C4≠C) before being used as a seed for the "G2" block. However, the motion vector H1 may be unrefined (e.g., H1=H) when used as the search center seed for the "G2" block. In some embodiments, all of the neighboring motion vectors may be the unrefined motion vectors pulled down from the higher layer (e.g., C4=C and H1=H).

In some embodiments, the refined motion vectors of the horizontal neighbors may be used as the search center seeds for some motion estimation refinements while the unrefined (e.g., pulled-down from the above layer) motion vectors of the vertical neighbors may be used as the seeds for other motion estimation refinements. The above mixed method may reduce a delay between searches and/or passes in some implementations, while giving a partial amount of the coding gain by using the refined current layer neighboring motion vectors wherever possible.

The motion estimation refinement searches may be conducted using fewer (e.g., only 1) neighboring motion vectors (e.g., the adjoining horizontal neighbor) or additional (e.g., 3, 4 or 5) neighboring motion vectors (e.g., the adjoining horizontal neighbor, the adjoining vertical neighbor, the diagonally adjoining neighbor and/or one or more adjacent neighbors that would normally be a neighbor of other blocks in the current group of blocks). For example, the refinement of the motion vector G1 may include all of the motion vectors F2, B4, C2, D3 and K2. Other combinations of neighboring motion vectors may be used to meet the criteria of a particular application.

Figure 6:
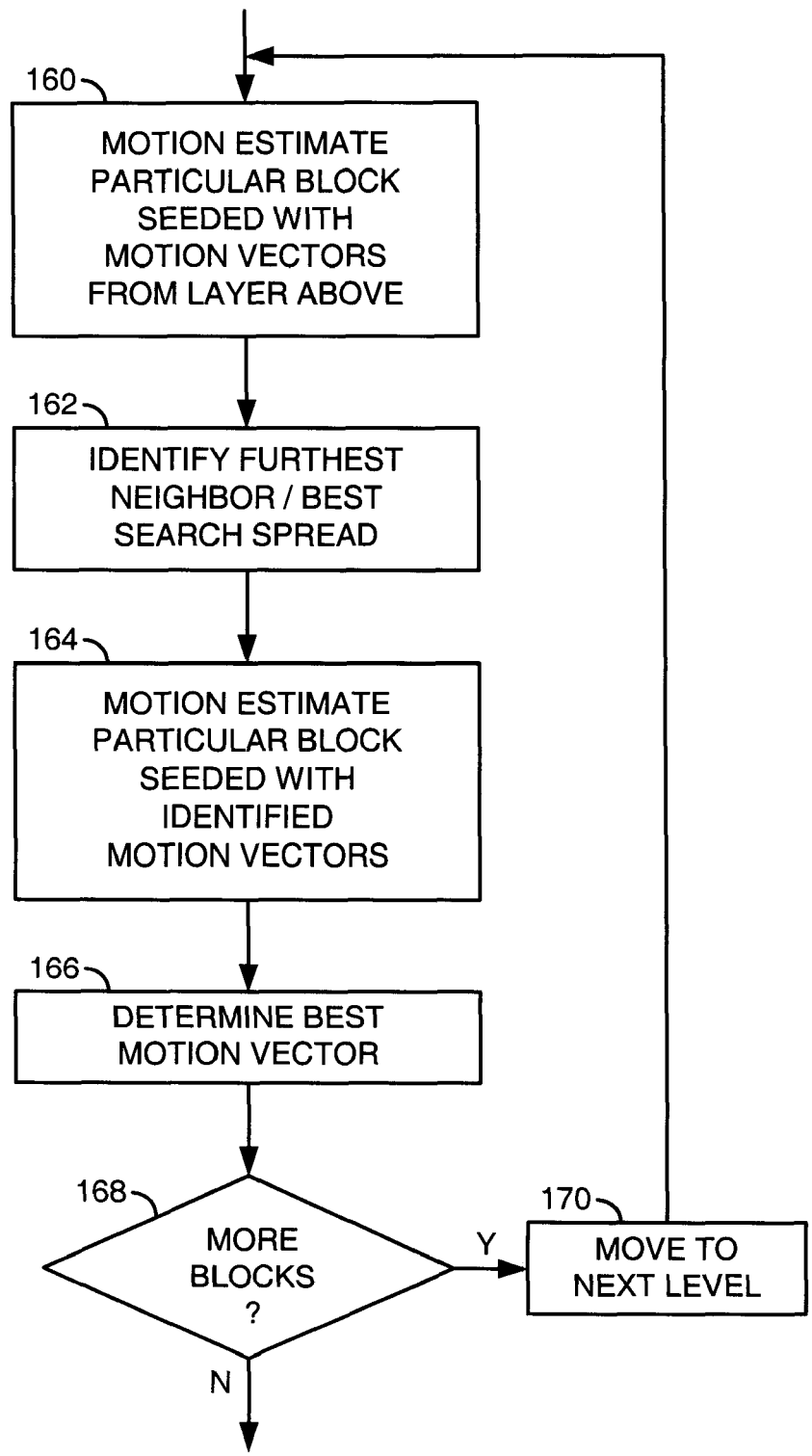
FIG. 6 is a flow diagram of a third example implementation of a motion estimation refinement method.

Referring to FIG. 6, a flow diagram of a third example implementation of a motion estimation refinement method 132c is shown. The method (or process) 132c may be implemented by the apparatus 102 and used as the step 132 of the method 120. The method 132c generally comprises a step (or block) 160, a step (or block) 162, a step (or block) 164, a step (or block) 166, a step (or block) 168 and a step (or block) 170.

Choosing a subset of the neighbors to search may be desirable. A selection of appropriate neighbors may be based on a spatial distance between the motion vectors. For example, a subset of the one or more neighboring motion vectors that are the furthest (e.g., in Euclidean or L1-norm distance) from the current block motion vector search center may be identified for the one or more additional searches.

In the step 160, the circuit 102 may refine the motion vector of a particular block using the pulled-down motion vector as the search center seed. The "furthest" one or more neighboring motion vectors may be identified by the circuit 102 in the step 162. Additional refinements may be conducted by the circuit 102 in the step 164 using the identified motion vectors as the seeds. Thereafter, a best motion vector may be determined in the step 166 and stored in the circuit 104. If more blocks are available (e.g., the YES branch of step 168), the circuit 102 may move to the next block in the step 170. Otherwise (e.g., the NO branch of step 168), the refinement at the current layer may end.

A selection of the neighboring motion vectors may also be made to create a largest spatial spread among the search centers (e.g., the set that encompasses the largest region/area). In the method 132c, the step 162 may identify one or more neighboring motion vectors producing a widest-spread search area. After that, the method 132c may continue as before, refining the motion estimations of the particular block in the step 164 and determining the best motion vector in the step 166.

Figure 7:
FIG. 7 is a diagram of an example picture divided into blocks and sub-blocks.

Referring to FIG. 7, a diagram of an example picture 172 divided into blocks and sub-blocks is shown. The example is based on the partitions of the H.264 recommendation. Other size partitions may be implemented to meet the criteria of a particular application.

A current picture undergoing a motion estimation may be initially divided into multiple blocks (e.g., 8×8 pixel blocks). Each of the blocks may have an associated motion vector, labeled A-L in the figure. A subsequent partitioning may divide the current picture into multiple sub-blocks (e.g., 8V×4H pixel blocks). Each of the sub-blocks may have one or more associated motion vectors, labeled A1-L2 in the figure.

Figure 8:
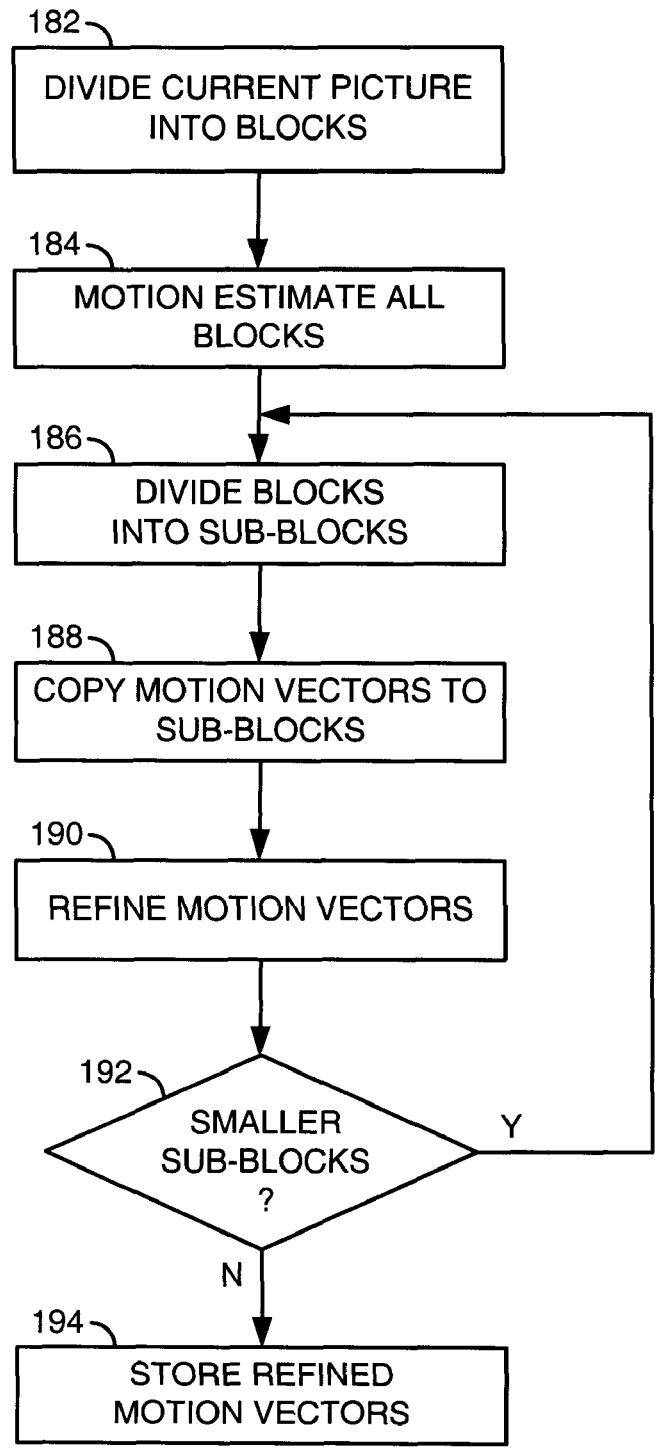
FIG. 8 is a flow diagram of an example implementation of a method of a sub-block motion estimation.

Referring to FIG. 8, a flow diagram of an example implementation of a method 180 of a sub-block motion estimation is shown. The method (or process) 180 may be implemented by the apparatus 100. The method 180 generally comprises a step (or block) 182, a step (or block) 184, a step (or block) 186, a step (or block) 188, a step (or block) 190, a step (or block) 192 and a step (or block) 194.

The present invention may be used in a non-hierarchical motion estimation. In particular, modern coding standards generally permit using multiple different block sizes for motion compensation. In a motion estimation operation that attempts to reduce the complexity of searching over the multiple different block sizes, search results from larger block sizes may seed the search centers for smaller block sizes. Implementation of the present invention may increase a quality of the encoding where limited search resources are available. The method 180 may also be applied even if the motion search is not hierarchical. For example, the method 180 may be initially applied at a macroblock level (e.g., 16×16 pixels), then down to a block level (e.g., 8×8 pixels) and finally a sub-block level (e.g., 8×4, 4×8 and 4×4 pixels).

In the step 182, the circuit 102 may divide the current picture into blocks. A motion estimation may then be conducted for each of the macroblocks by the circuit 102 in the step 184 to estimate the associated motion vectors (e.g., motion vectors A-L). The current picture may be further divided by the circuit 102 into sub-blocks in the step 186. The motion vectors A-L from the block level (or layer) may be copied into the corresponding motion vectors A1-L2 by the circuit 102 in the step 188. Each block level motion vector may be copied into multiple (e.g., 2) of the sub-block motion vectors (e.g., A1=A and A2=A).

A motion estimation refinement may be processed by the circuit 102 in the step 190 to adjust the sub-block level motion vectors A1-L2 (e.g., usually A1≠A and A2≠A). The refinement step 190 may use any of the several refinement techniques described above (e.g., methods 132a-132c). If smaller sub-blocks (e.g., 4×4 pixels) are available to refine (e.g., the YES branch of step 192), the steps 186-190 may be repeated using the motion vectors from the current sub-blocks as seeds to the smaller sub-blocks. Once all of the smallest sub-blocks have been adjusted (e.g., the NO branch of step 192), the circuit 102 may store the best motion vectors in the circuit 104 per the step 194.

The present invention generally uses multiple (e.g., 2) "passes" at each layer or level. An advantage of the two pass technique is that refined (e.g., first pass) motion vectors (searched and refined around search centers received from a higher layer of the motion estimation hierarchy) from all neighboring blocks may be available for the second pass refinement stage (which uses the refined neighboring motion vectors for search centers). However, non-causal neighbors (e.g., if processing proceeds down and to the right, the left neighbors and the above neighbors are causal neighbors while the below neighbors and the right neighbors are non-causal neighbors) may be available for the refinement. For example, a single pass of the motion estimation refinement processing (due to limited resources) may be achieved by utilizing the motion vectors from casual neighbors and the motion vectors from the non-casual neighbors.

The functions performed by the diagrams of FIGS. 1-8 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the scope of the invention.

The invention claimed is:

1. A method of motion estimation refinement, comprising the steps of:
    (A) generating an initial motion vector by conducting a first motion estimation on an initial block in a picture, said initial block covering an initial area of said picture;
    (B) generating a current motion vector by conducting a second motion estimation on a current block in said picture, (i) said current block covering a subset of said initial area and (ii) said second motion estimation being seeded by said initial motion vector;
    (C) generating at least one additional motion vector by conducting at least one third motion estimation on said current block, said at least one third motion estimation being seeded respectively by at least one neighboring motion vector spatially adjacent to said current motion vector; and
    (D) generating a refined motion vector of said current block by storing in a memory a best among said current motion vector and said additional motion vector.

2. The method according to claim 1, wherein (i) said first motion estimation is conducted at a top layer of a plurality of layers in a hierarchical motion estimation and (ii) both said second motion estimation and said third motion estimation are conducted at a lower of said layers below said top layer.

3. The method according to claim 1, wherein (i) said current block comprises a sub-block of said initial block and (ii) all of said first motion estimation, said second motion estimation and said third motion estimation are conducted at a same resolution of said picture.

4. The method according to claim 1, wherein (i) said neighboring motion vector comprises a first motion vector of a first block spatially adjoining said current block and (ii) said first motion vector is not copied from said initial motion vector.

5. The method according to claim 4, wherein (i) said neighboring motion vector further comprises a second motion vector of a second block spatially adjoining said current block, (ii) said second block is different than said first block and (iii) said second motion vector is not copied from said initial motion vector.

6. The method according to claim 5, wherein (i) said neighboring motion vector further comprises a third motion vector of a third block spatially diagonal to said current block, (ii) said third block is different than both said first block and said second block and (iii) said third motion vector is not copied from said initial motion vector.

7. The method according to claim 1, further comprising the step of:
identifying said neighboring motion vector as a particular motion vector among a plurality of candidate motion vectors of a plurality of candidate blocks spatially adjacent to said current block such that said particular motion vector is spatially furthest from said current motion vector.

8. The method according to claim 1, further comprising the step of:
identifying said neighboring motion vector as at least two particular motion vectors among a plurality of candidate motion vectors of a plurality of candidate blocks adjacent to said current block such that said particular motion vectors cover a largest search area among said candidate motion vectors.

9. The method according to claim 1, further comprising the step of:
motion refining said neighboring motion vector before seeding said third motion estimation.

10. The method according to claim 1, wherein said neighboring motion vector is not motion refined before seeding said third motion estimation.

11. An apparatus comprising:
a memory; and
a circuit configured to (i) generate an initial motion vector by conducting a first motion estimation on an initial block in a picture, said initial block covering an initial area of said picture, (ii) generate a current motion vector by conducting a second motion estimation on a current block in said picture, (a) said current block covering a subset of said initial area and (b) said second motion estimation being seeded by said initial motion vector, (iii) generate at least one additional motion vector by conducting at least one third motion estimation on said current block, said at least one third motion estimation being seeded respectively by at least one neighboring motion vector spatially adjacent to said current motion vector and (iv) generate a refined motion vector of said current block by storing in said memory a best among said current motion vector and said additional motion vector.

12. The apparatus according to claim 11, wherein (i) said first motion estimation is conducted at a top layer of a plurality of layers in a hierarchical motion estimation and (ii) both said second motion estimation and said third motion estimation are conducted at a lower of said layers below said top layer.

13. The apparatus according to claim 11, wherein (i) said current block comprises a sub-block of said initial block and (ii) all of said first motion estimation, said second motion estimation and said third motion estimation are conducted at a same resolution of said picture.

14. The apparatus according to claim 11, wherein (i) said neighboring motion vector comprises a first motion vector of a first block spatially adjoining said current block and (ii) said first motion vector is not copied from said initial motion vector.

15. The apparatus according to claim 14, wherein (i) said neighboring motion vector further comprises a second motion vector of a second block spatially adjoining said current block, (ii) said second block is different than said first block and (iii) said second motion vector is not copied from said initial motion vector.

16. The apparatus according to claim 15, wherein (i) said neighboring motion vector further comprises a third motion vector of a third block spatially diagonal to said current block, (ii) said third block is different than both said first block and said second block and (iii) said third motion vector is not copied from said initial motion vector.

17. The apparatus according to claim 11, wherein said circuit is further configured to identify said neighboring motion vector as a particular motion vector among a plurality of candidate motion vectors of a plurality of candidate blocks spatially adjacent to said current block such that said particular motion vector is spatially furthest from said current motion vector.

18. The apparatus according to claim 11, wherein said circuit is further configured to identify said neighboring motion vector as at least two particular motion vectors among a plurality of candidate motion vectors of a plurality of candidate blocks adjacent to said current block such that said particular motion vectors cover a largest search area among said candidate motion vectors.

19. The apparatus according to claim 11, wherein said circuit is further configured to motion refine said neighboring motion vector before seeding said third motion estimation.

20. An apparatus comprising:
means for storing; and
means for (i) generating an initial motion vector by conducting a first motion estimation on an initial block in a picture, said initial block covering an initial area of said picture, (ii) generating a current motion vector by conducting a second motion estimation on a current block in said picture, (a) said current block covering a subset of said initial area and (b) said second motion estimation being seeded by said initial motion vector, (iii) generating at least one additional motion vector by conducting at least one third motion estimation on said current block, said at least one third motion estimation being seeded respectively by at least one neighboring motion vector spatially adjacent to said current motion vector and (iv) generating a refined motion vector of said current block by storing in said means for storing a best among said current motion vector and said additional motion vector.

* * * * *